(12) United States Patent
Kare

(10) Patent No.: US 6,289,957 B1
(45) Date of Patent: *Sep. 18, 2001

(54) CONTROL METHOD AND APPARATUS OF A TREE HARVESTING MACHINE

(75) Inventor: Erkki Kare, Pirkkala (FI)

(73) Assignee: Plustech Oy, Tampere (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/381,063

(22) PCT Filed: Jan. 18, 1999

(86) PCT No.: PCT/FI99/00029

§ 371 Date: Sep. 15, 1999

§ 102(e) Date: Sep. 15, 1999

(87) PCT Pub. No.: WO99/35900

PCT Pub. Date: Jul. 22, 1999

(30) Foreign Application Priority Data

Jan. 16, 1998 (FI) ........................................................ 980092

(51) Int. Cl.$^7$ ................................................. A01G 23/08
(52) U.S. Cl. ........................ 144/338; 144/24.13; 144/4.1; 144/356; 144/382
(58) Field of Search ................................. 144/4.1, 24.13, 144/34.1, 335, 336, 356, 357, 382

(56) References Cited

U.S. PATENT DOCUMENTS

| | | | |
|---|---|---|---|
| 3,554,249 | * 1/1971 | Arnelo | 144/357 |
| 4,250,935 | * 2/1981 | Helgesson et al. | 144/357 |
| 4,513,799 | 4/1985 | Lindblom et al. | 144/379 |

FOREIGN PATENT DOCUMENTS 450356    9/1988   (SE) .

OTHER PUBLICATIONS http://www.orebro.asdo.se/tidning/ti_sprik.htm,
"Bergslaghen Skog & Trä 4/97" Published in 1997 (with translation).
Ulf Hallonborg, Dag Myhrman, Publication "Skogforsk–Nytt, Feb. 1997" Published in 1997 (with translation).

* cited by examiner

Primary Examiner—W. Donald Bray
(74) Attorney, Agent, or Firm—Quarles & Brady LLP

(57) ABSTRACT

In a control method of a tree harvesting machine, the tree harvesting machine comprises a tree-supporting part (1) with a feeding means (2) for feeding the tree in its longitudinal direction and a cross-cutting saw (5) for cutting the tree at selected locations. The part (1) is supported by a boom assembly (6) or the like. At the moment of action of the cross-cutting saw (5), the tree-supporting part (1) is moved by means of the control automatics of the tree harvesting machine in such a way that the force caused by the weight of the tree, tending to bend the tree at the cutting point and thereby tending to cleave the tree, is compensated at least partly.

9 Claims, 4 Drawing Sheets

is not possible

CONTROL METHOD AND APPARATUS OF A TREE HARVESTING MACHINE

Figure 1:
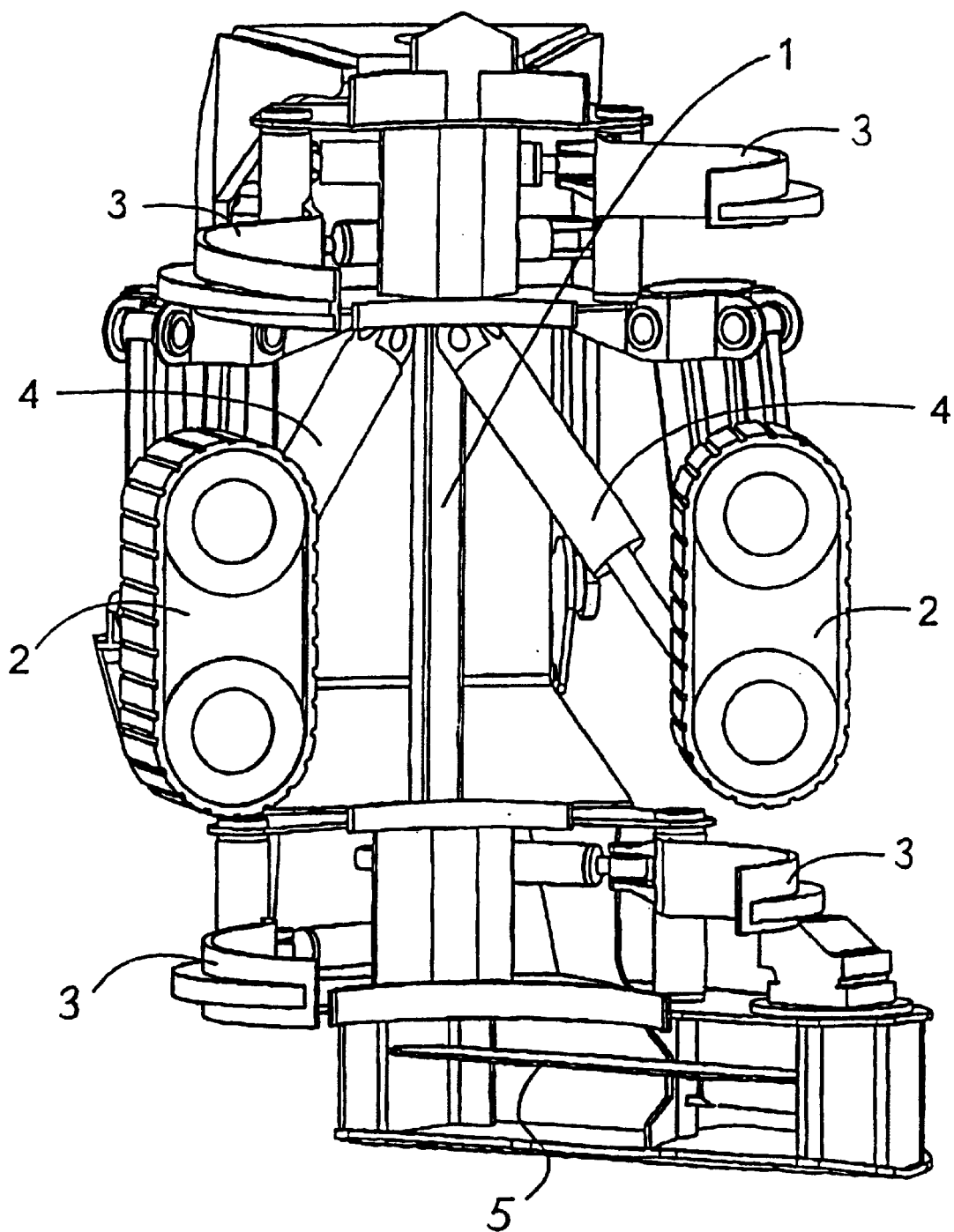

The invention relates to a control method of a tree harvesting machine which is presented in the preamble of the appended claim 1. The invention relates also to a control apparatus which is of the type presented in the preamble of the appended claim 5.

The invention is intended for use in forest machines movable in the terrain, such as grapple harvesters. Such forest machines have a tree manipulating part, a grapple, at the end of an arm arranged movable in a body. The part comprises a cross-cutting saw for cutting off a tree and cutting it into lengths of determined size, as well as a tree feeding device for feeding the cut tree forward. Such forest machines are presented e.g. in European patent 428530, Finnish patent 79927 and U.S. Pat. No. 4,742,854.

Upon starting the processing of trees cut with such machines, the butt end of the tree is between feeding means, such as rolls or wheels, and it is also supported by delimbing blades. The feeding device pushes the stem past the cross-cutting saw a distance corresponding to the cutting length. Particularly with thick stems, the weight of the stem becomes so high that it tends to bend the tree at the cutting point so that the cutting track does not become even and damage may be caused in the tree, in the worst case cracks.

In a cutting situation, it is not possible to support the tree on the butt end side, because the cross-cutting saw is the lowest means in the tree processing part, i.e. the means closest to the butt end at the cutting point, and it has to fit lowest in the cutting off of the tree, i.e. as close to the ground as possible.

Swedish published specification 409431 presents a device for cutting a felled tree, in which the saw swinging from below upwards during the cutting movement is followed by a wedge means to avoid cracks in the remaining part of the tree, as well as stucking of the saw. In the swinging motion from above downwards, which is recommended for smaller stems, no auxiliary means are used to prevent cracks. The cutting device in question is not intended for a tree harvesting machine movable in the terrain.

It is an aim of the invention to present a method for eliminating said drawback and for avoiding quality problems to a maximum extent in timber intended for high-quality wood products. For achieving this aim, the method according to the invention is primarily characterized in what will be presented in the characterizing part of the appended claim 1. An essential aspect in the invention is to move the part supporting the tree at the very moment of cutting to compensate for the force tending to bend the tree. This involves a momentary movement produced by control automatics and timed precisely at the moment of action of the cross-cutting saw, to make the bending moment at the time of cutting as close to zero as possible, or at least considerably smaller than without the movement. It is important that the function is performed automatically by means of the control automatics of the machine at the right moment in the cutting sequence of the tree stem without the operator needing to produce it by his own special manual measures by manoeuvring respective actuators. Other features of the invention will be presented in the appended dependent claims 2 to 4.

The control apparatus of a tree harvesting machine for applying the invention is, in turn, characterized in what will be presented in the characterizing part of the appended claim 5. The operations of the invention can be implemented with an apparatus in which the control means of the cross-cutting saw are connected in a suitable way to the actuators responsible for the movements of the part supporting the tree.

Other advantageous features of the apparatus will be presented in the appended dependent claims 6 and 7.

Figure 2:
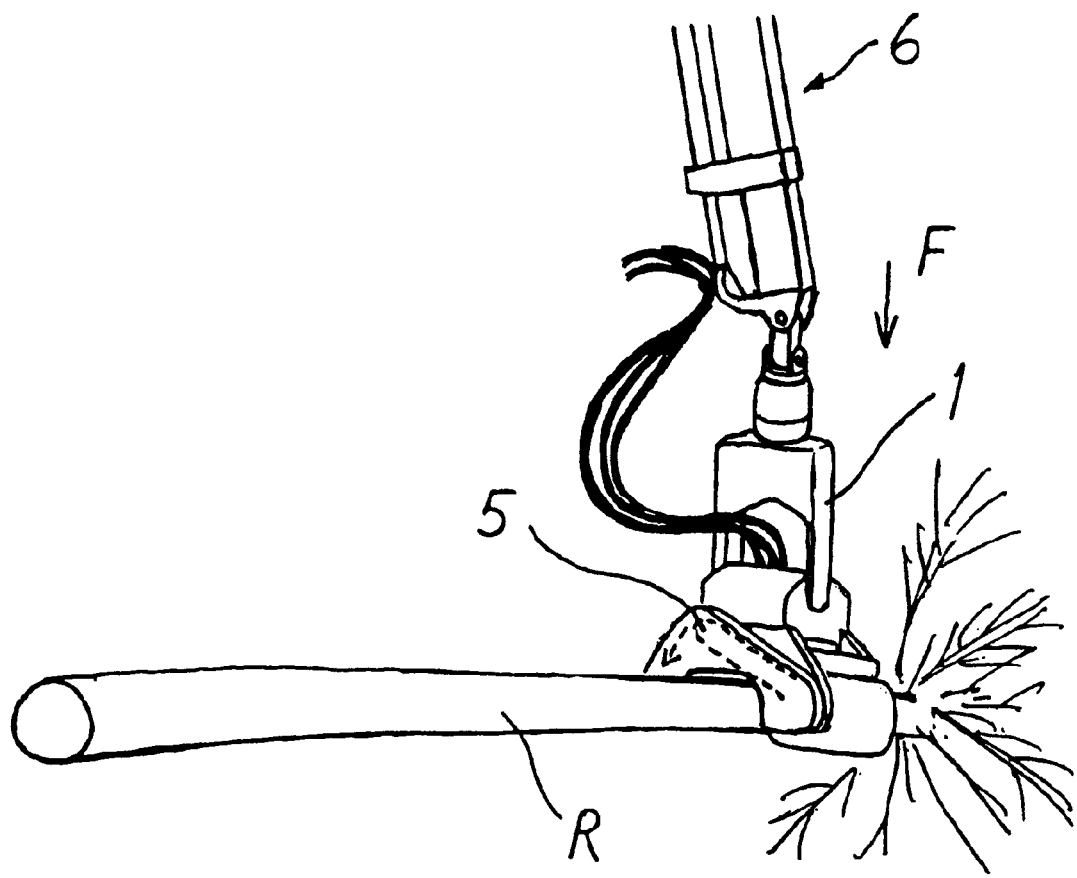
Figure 3:
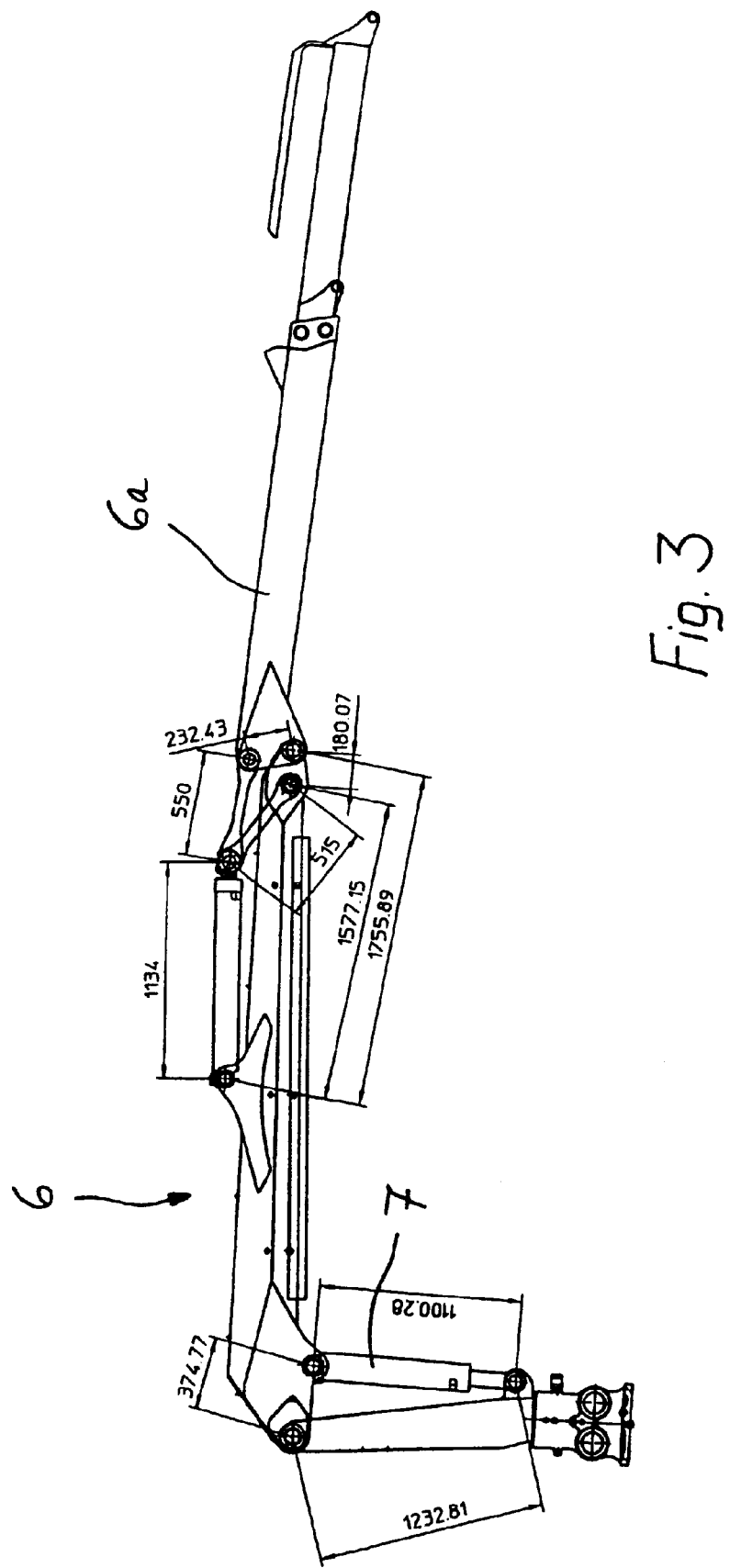
Figure 4:
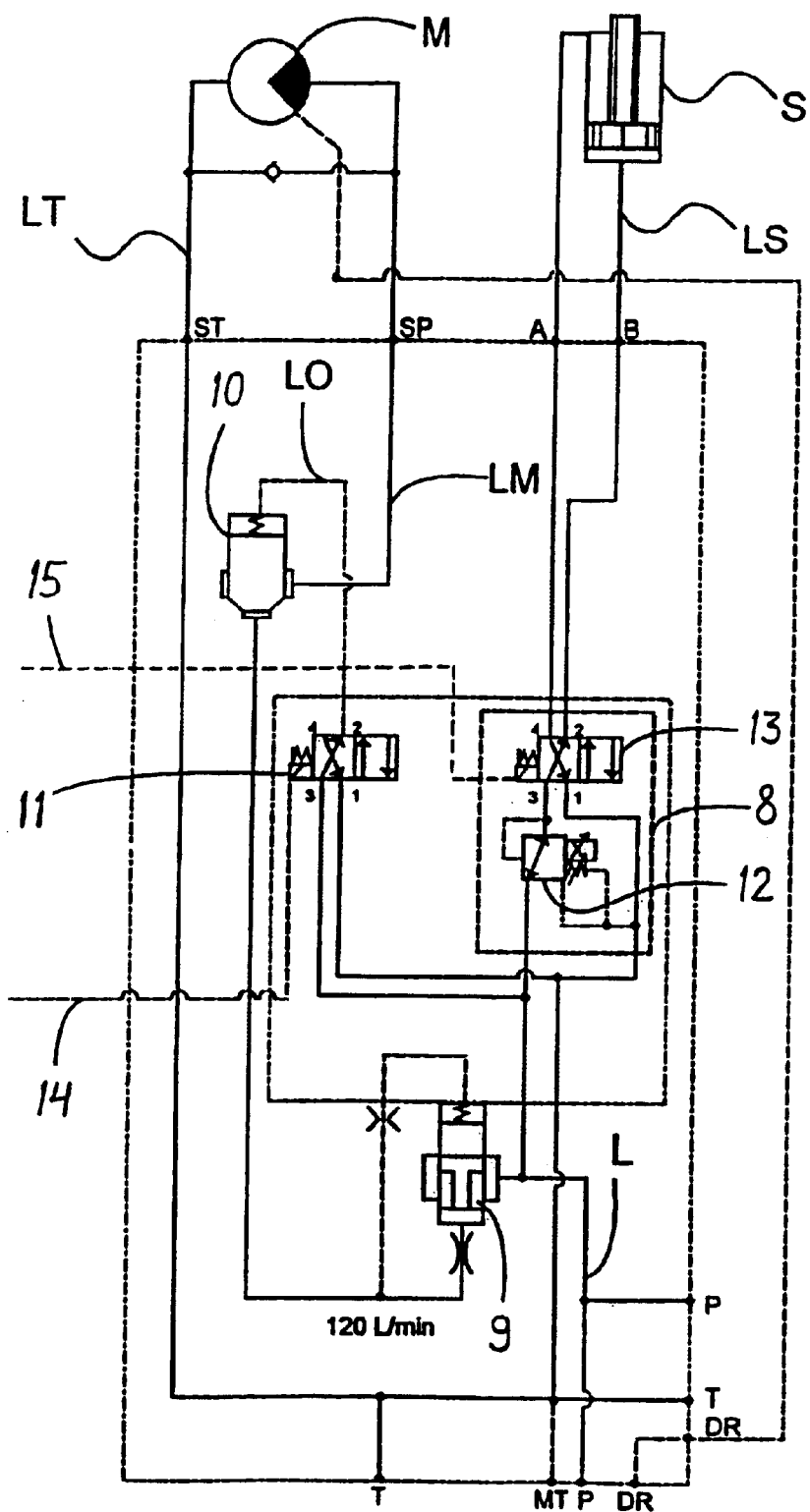

In the following, the invention will be described in more detail with reference to the appended drawings, in which FIG. 1 shows a tree supporting part of a forest machine in a general view, FIG. 2 shows the part in an operating situation before the critical cutting step, FIG. 3 shows a boom assembly in a tree harvesting machine, supporting the part shown in FIGS. 1 and 2, and FIG. 4 shows a control diagram for implementing the invention.

FIG. 1 shows a tree supporting and manipulating part 1, grapple, fixed at the end of a hydraulically driven boom assembly of a forest machine, in this case a grapple harvester, the frame of the grapple being equipped with a feeding device 2, which in the case shown in the figure consists of two tracks articulated in the frame so that they can be moved towards the tree stem left therebetween by hydraulic cylinders 4 so that the tree stem is pressed between the tracks. Furthermore, the frame of the tree supporting part 1 is also equipped with hydraulically movable delimbing blades 3 which cut off the branches of the tree during movement of the stem pulled by the feeding device 2. The blades located on both sides of the feeding device in the direction of the stem can be used also to press and support the stem of the tree. At the butt end, the part 1 is equipped with a hydraulically driven chain saw 5, with which the tree stem is cross-cut at the butt end and thereafter cut into logs of suitable length.

FIG. 2 shows the situation after the tree has been cut at the butt end, it has fallen down and is approximately horizontal, supported by the part 1, and the feeding device 2 has fed the tree stem R a certain length, the butt end in front, to a first cutting point K. The chain saw 5 is arranged to swing by the effect of the feeding cylinder of the saw from above downwards (arrow) to perform the cutting. At the cutting point K, the weight of the portion fed forward and hanging freely causes a bending moment which tends to bend the tree at the cutting point when the saw penetrates the tree in the direction of the arrow. Underneath the cutting edge of the saw, the portion to be cut is fixed to the rest of the tree and thereby to the part 1 supporting the tree via a continuously decreasing area. Thus, in the worst case, the tree is broken at the cutting point, leaving a small tongue at said area in the stem cut off. In a slightly generalized manner, it can be stated that this phenomenon is the same as occurs when a long tree is cut on a saw horse and the portion in the air outside the saw horse is heavy.

At the moment of sawing, preferably already after the feeding movement of the saw has started, a jerk-like movement is induced by means of the control automatics of the tree harvesting machine in the boom assembly 6 supporting the part 1 in such a way that the part 1 moves suddenly downwards in the direction of arrow F. The movement is sudden, but the length of the movement needs only to be short so that the bending moment is compensated by the inertial forces of the tree stem R at least for the time until the saw has completed the cutting. Such a movement can be generated simply e.g. by utilizing the weight of the boom assembly 6, the tree supporting part 1 and the tree itself, i.e. by releasing for a short time any of the actuators of the boom assembly which acts against the gravity and is capable of keeping the part 1 in its height position. It is also possible to use an active quick-operated actuator intended for making the movement.

The operation time of the cross-cutting saw 5 is very short, often less than a second. With stems with a large diameter, in which the crack problem particularly occurs, it can be longer than a second. Thanks to the relatively short time of action, it is possible to use the jerking movement to achieve compensation of the bending moment precisely for the period of time which is most critical in view of the final result of the sawing. The movement can be timed e.g. according to the feeding movement of the saw, and it is started preferably at the time when it is detected by the control automatics that the feeding of the saw has started or the saw has penetrated the tree. It is important that the movement is not timed at a too early moment, because when the compensating movement has stopped, inertial forces will raise the bending moment considerably higher than the original, if the portion of the stem to be cut is still attached to the rest of the stem. The movement may last preferably slightly past the cutting step rather than fall short. The required lengths of movement are not long, but the movement must be sufficiently quick.

FIG. 3 shows a boom assembly 6 arranged in the body of the forest machine, consisting of swinging arms to turn around a vertical axis, a tree manipulating part 1 hanging at the end of the boom assembly 6. Reference numeral 7 indicates a cylinder supporting the boom assembly in its height position, i.e. a lifting cylinder, which is arranged to lift and to lower the arm of the boom assembly which is closest to the body. When the cut tree is supported by the part 1 and the saw 5 is ready to perform the first cutting, the cylinder 7 is pressurized and keeps the boom assembly 6 in the height position to which it has been actively adjusted by the cylinder. When the saw 5 is in operation, the cylinder is released from pressure for a short moment, wherein the part 1 descends correspondingly downwards in a jerk-like manner. The position can be restored with the cylinder gradually before the next cutting operation.

It is also possible to use other cylinders or other actuators which are located in suitable positions in the boom assembly and produce as straight a downwards movement as possible. For example, it is possible to utilize a folding cylinder between the arms of the boom assembly, or an actuator in the telescopic arm 6a closest to the part 1 in the end of the boom assembly. By using the existing parts in the boom assembly, no changes need to be made in the structure of the boom assembly itself. Also, instead of moving the swinging arms of the boom assembly 6 to effect said movement, the part 1 itself can be suspended from the end of the boom assembly by means of a special actuator so that it falls downwards with respect to the boom assembly 6 at a suitable moment.

FIG. 4 illustrates the control automatics that can be applied in the invention. The figure shows a feeding cylinder S for the saw, to generate the feeding movement of the saw, i.e. its swinging to perform a cutting motion. The feeding cylinder S is kinetically coupled with the saw so that it induces the swinging of the guide bar of the chain saw 5 in the part 1. Pressurized medium is supplied via a line L both to the saw feeding cylinder S, by which the saw 5 is turned in the frame of the part 1 to perform cutting, and to the saw motor M which brings about the rotation of the saw. The line L branches out to a line LS which is passed to the feeding cylinder S via means 8 for controlling the feeding motion of the saw, and to a line LM to the motor via a restriction valve 9 and a control valve 10. The pressurized medium is supplied from the line L also via a starting valve 11 to the control valve 10 for the motor M via a line LO. The pressurized medium opens the control valve 10 when the starting valve 11 is open. Thus, pressurized medium is conveyed via the restriction valve 9 through the control valve 10 to the motor M, wherein the motor starts to rotate. The motor M starting valve 11 is controlled electrically in a way known as such. The return line for the pressurized medium from the motor is indicated with the reference sign LT.

The means 8 for controlling the saw feeding cylinder S comprise a control valve 12 to control the pressure in the line LS, i.e. the feeding force of the saw, as well as a directional control valve 13 for controlling the feeding direction of the saw. In the position shown in FIG. 4, the directional control valve 13 is in the position to start the swinging motion of the saw 5.

An actuator for effecting the movement according to the invention, such as the hydraulic cylinder presented above, can receive its operational command from the position of the control means influencing the operation of the saw 5. The control line which is indicated with the reference numeral 14 in the figure can receive its information from the position of the starting valve 11 of the motor M, e.g. directly from the control of its spool. Another alternative, illustrated with the control line 15, is to pick up information on the position of the directional control valve 13; in other words, when it has moved into the position effecting the feeding motion of the saw, information is transmitted to the actuator. It is also possible to use sensors or switches located in the part 1 and recognizing the swinging position of the saw. In order to time the action of the actuator effecting the movement correctly with respect to the cutting step, it can be arranged to operate with a suitable delay with respect to the control means of the saw, for example in a way that the movement starts first after the saw has penetrated the tree in a certain depth. The following is a more detailed description on the possibilities to utilize the position of the saw for timing the action.

Preferably, the part 1 is lowered down in a sudden movement so that the action in question is dependent on the position of the cross-cutting saw. The action is synchronized with the position of the cross-cutting saw so that when it is in a predetermined position, a guide position, the control system issues automatically a command for effecting a sudden movement downwards. The position of the saw can be detected either indirectly by measuring time or by means of sensors placed in the part 1 to recognize the position, e.g. on the basis of the stage of the stroke of the saw feeding cylinder S, the action of a limit switch dependent on the motion of the saw, or an angle sensor indicating the position of the saw. The guide position is not necessarily constant but it can be determined by using also data obtained from the measurement of the diameter of the tree and from the measurement of its feeding length, in other words how long a portion of the tree is free and how thick the tree to be cut is, these factors correlating with the tendency to crack off. Thus, it is possible to calculate the guide position by means of the measurement data immediately before cutting the tree, and to act accordingly.

In the determination of the moment of starting the downwards directed movement, also delays in the control system are taken into account, including the time constants of various valves. This can be taken into account when the guide position of the saw is determined.

In practice, when gravity is used for achieving the movement, the actuator keeping the tree manipulating part 1 in a constant height position is released, such as the lifting cylinder 7 of the boom assembly, or a separate actuator added between the tree manipulating part 1 and the last swinging arm in the end of the boom assembly. In connection with the actuators, such as the above-described hydraulic cylinder 7, it is possible to use a quick valve operating according to the function of the saw to discharge pressurized medium from the pressure side of the cylinder. For example, the hydraulic actuators can be let on free circulation for a short time; thus, the valve capable of letting the corresponding cylinder on free circulation receives a command from the control system at the right moment, which is determined in the above-described manner.

The control means shown in FIG. 4 are located in the part 1 at the end of the boom, and they are controlled by means of control automatics located in the control cabin and receiving commands from the control cabin. The operation according to the invention can be well implemented by means of the electronic control automatics of the machine.

What is claimed is:

1. A control method of a tree harvesting machine, wherein the tree harvesting machine comprises a tree-supporting part with a means for feeding the tree in its longitudinal direction and a cross-cutting saw for cutting the tree at selected locations, wherein said tree-supporting part is supported by a support assembly, wherein at the moment of action of the cross-cutting saw, the tree-supporting part is automatically moved by means of control automatics of the tree harvesting machine so that the force caused by the weight of the tree, tending to bend the tree at the cutting point and thereby tending to cleave the tree, is compensated at least in part.

2. A method according to claim 1, wherein the motion is induced by an actuator moving the support assembly or a part thereof in the height direction.

3. A method according to claim 1 wherein a command for movement is given in the control automatics, for example with a predetermined delay, on the basis of data having an effect on or being dependent on the action of the saw.

4. A method according to claim 1 wherein a command for movement is given in the control automatics on the basis of the position of the saw.

5. A control apparatus of a tree harvesting machine, the tree harvesting machine comprising a tree-supporting part with a means for feeding the tree in its longitudinal direction and a cross-cutting saw for cutting the tree at selected locations, and a support assembly for supporting said tree-supporting part, wherein the control apparatus comprises means for controlling the cross-cutting saw and means for controlling the movement of the tree-supporting part, wherein the means for controlling the cross-cutting saw or means for recognizing or determining the position of the cross-cutting saw are connected through an operational command line to the means for controlling the movement of the tree supporting part in such a way that at the moment of action of the saw, the means for controlling the movement of the tree-supporting part automatically induces a movement in the tree-supporting part which at least partly compensates the force which is caused by the weight of the tree and which tends to cleave the tree at the cutting point.

6. A control apparatus according to claim 5, wherein the means for controlling the saw or the means for recognizing or determining the position of the saw are connected to means for controlling an actuator accomplishing movement of the support assembly or a part thereof in the height direction.

7. A control apparatus according to claim 5, wherein the means for controlling the saw or means for recognizing or determining the position of the saw are connected to means for controlling an actuator accomplishing movement of the tree-supporting part with respect to the support assembly or a part thereof in the height direction.

8. A method according to claim 3, wherein a command for movement is given in such a way that the tree-supporting part is moved after the saw has penetrated the tree in a certain depth.

9. A control apparatus according to claim 5, wherein the means for recognizing or determining the position of the saw includes a sensor or switch located in the tree-supporting part.

* * * * *